(12) United States Patent
Tsukamoto et al.

(10) Patent No.: US 7,438,353 B2
(45) Date of Patent: Oct. 21, 2008

(54) GUIDE TUBE-FIXING STRUCTURE FOR SUNROOF DEVICE

(75) Inventors: Hiroyuki Tsukamoto, Tochigi (JP); Kazutaka Sugimoto, Tochigi (JP); Michio Tamura, Saitama (JP); Akihiko Kuribayashi, Saitama (JP)

(73) Assignees: Honda Motor Co., Ltd., Tokyo (JP); Yachiyo Kogyo Kabushiki Kaisya, Sayama-shi (JP)

( * ) Notice: Subject to any disclaimer, the term of this patent is extended or adjusted under 35 U.S.C. 154(b) by 0 days.

(21) Appl. No.: 11/802,773

(22) Filed: May 24, 2007

(65) Prior Publication Data

US 2008/0054684 A1 Mar. 6, 2008

(30) Foreign Application Priority Data

May 25, 2006 (JP) ............................. 2006-144962
Mar. 9, 2007 (JP) ............................. 2007-060041

(51) Int. Cl.
*B60J 7/00* (2006.01)

(52) U.S. Cl. ................... 296/214; 296/216.08; 296/223

(58) Field of Classification Search ................. 296/214, 296/216.08, 223

See application file for complete search history.

(56) References Cited

U.S. PATENT DOCUMENTS

| 4,811,985 A | * | 3/1989 | Kruger et al. ............... 296/214 |
| 5,941,598 A | * | 8/1999 | Cave et al. .................. 296/213 |
| 6,129,413 A | * | 10/2000 | Klein ..................... 296/220.01 |
| 6,161,893 A | * | 12/2000 | Ewing et al. ................ 296/152 |
| 6,880,884 B2 | * | 4/2005 | Sugiura ................. 296/216.08 |

FOREIGN PATENT DOCUMENTS

JP 2005-41362 2/2005

* cited by examiner

*Primary Examiner*—Dennis H Pedder
(74) *Attorney, Agent, or Firm*—Kratz, Quintos & Hanson, LLP

(57) ABSTRACT

In a guide tube-fixing structure for sunroof device 1 that includes cables C1, C2 for opening and closing a roof panel 4 by push-pull operation; guide rails 5, 5 for guiding opening/closing of the roof panel 4; sunshade rails 20, 20 for opening/closing of a sunshade panel, guide tubes P1-P4 for the cables C1, C2 are disposed along a rear portion of the sunshade rails 20, 20 each extending further rearward from the rear end portion of the guide rail 5 and the guide tubes P1-P4 are fixed to the rear portion of the sunshade rail 20.

6 Claims, 6 Drawing Sheets

PRIOR ART

GUIDE TUBE-FIXING STRUCTURE FOR SUNROOF DEVICE

CROSS-REFERENCE TO RELATED APPLICATIONS

This application claims the foreign priority benefit under Title 35, United States Code, section 119 (a)-(d), of Japanese Patent Applications No. 2006-144962, filed on May 25, 2006 and No. 2007-60041, filed on Mar. 9, 2007 in the Japan Patent Office, the disclosures of which are herein incorporated by reference in its entirety.

BACKGROUND OF THE INVENTION

1. Field of the Invention

The present invention relates to a sunroof device for a vehicle.

2. Description of the Related Art

As a general sunroof device for a vehicle, there can be mentioned a device including: a roof panel for covering an opening of a fixed roof; cables joined to the roof panel for opening and closing the roof panel by push-pull operation; and guide rails for guiding opening and closing of the roof panel (see, for example, Japanese patent laid-open application No. 2005-41362 (paragraphs 0012-0015 and FIG. 1)).

Figure 8:
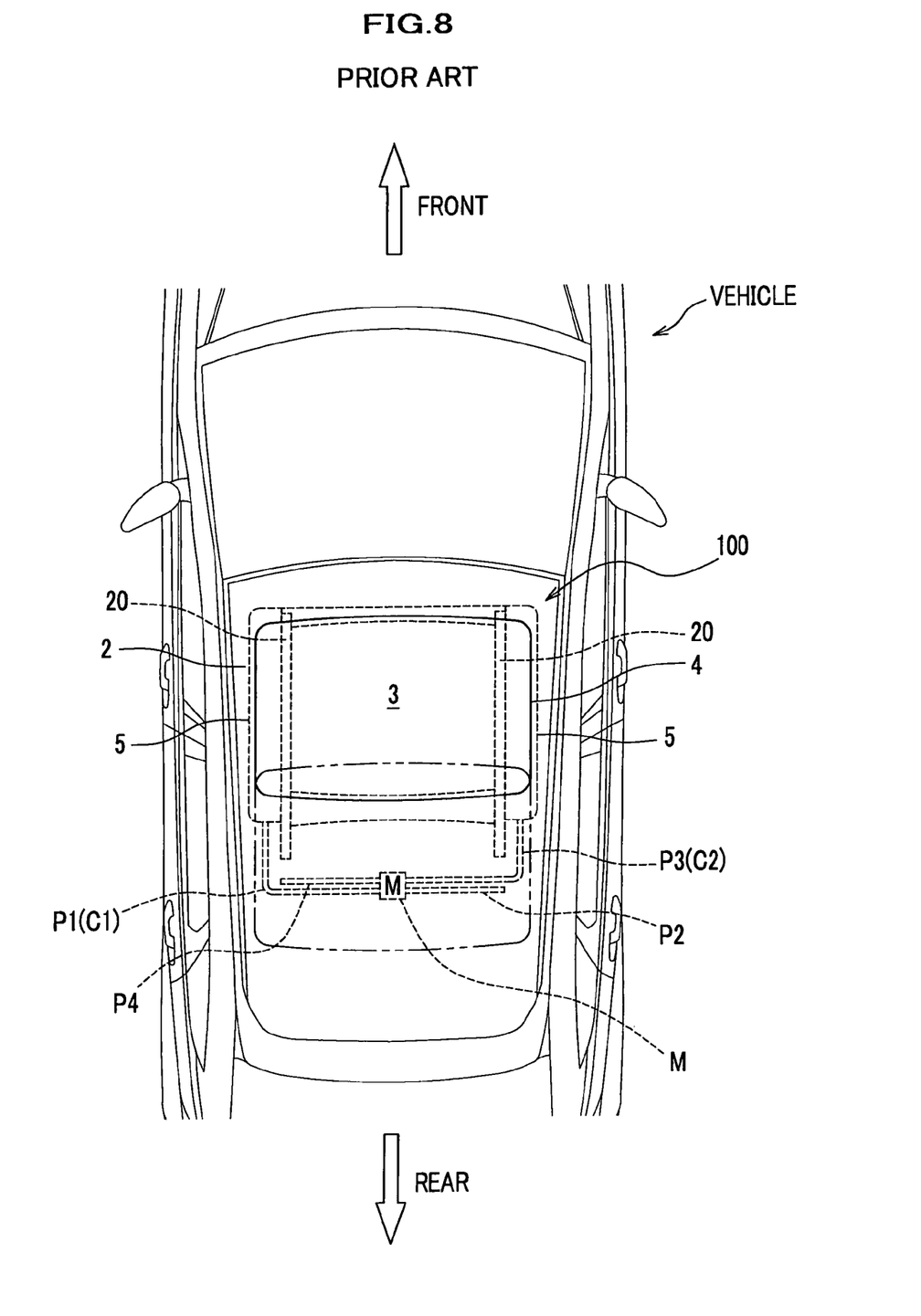
FIG. 8 is a plan view showing a conventional sunroof device.

A sunroof device 100 shown in FIG. 8 is one example of such a sunroof device. In this device, guide rails 5, 5 which are laterally symmetrical extend in a front-rear direction of a vehicle and are disposed under their respective lateral rims of a fixed roof 2 along an opening 3. Cables C1, C2 for performing synchronous push-pull operation are joined to their respective lateral rims of a roof panel 4, and open/close the roof panel 4 while stably supporting the roof panel 4.

The cables C1, C2 are inserted in a drive motor unit M disposed behind the opening 3, and engage with a pinion gear (not shown) in the drive motor unit M, which allows push-pull driving of the cables C1, C2.

In the cable C1, a portion of the cable C1 (driving path) on a joining side to one lateral rim of the roof panel 4, relative to the drive motor unit M, is inserted in a guide tube P1 for guiding the cable C1, and a rest of the cable C1 (idling path) on the other side is inserted in a guide tube P2 for guiding an extra length portion of the cable C1. Likewise, in the cable C2, a portion of the cable C2 (driving path) on a joining side to the other lateral rim of the roof panel 4 is inserted in a guide tube P3, and a rest of the cable C2 (idling path) on the other side is inserted in a guide tube P4.

The sunroof device 100 shown in FIG. 8 has a sunshade panel (not shown) for blocking light entering the opening 3, which opens and closes under the roof panel 4. Sunshade rails 20, 20 for guiding opening/closing of the sunshade panel are symmetrically disposed along their respective guide rails 5, 5 of the roof panel 4. When both of the lateral rims of the sunshade panel slide along their respective sunshade rails 20, 20 in a front/rear direction, the sunshade panel closes/opens while stably supporting the sunshade panel.

Since the roof panel 4 is configured in such a manner that a rear side of the roof panel 4 tilts up or down and slides rearward in a tilt-up or tilt-down state, a rear portion of the roof panel 4 overlaps the fixed roof 2 when the sunroof device 100 is opened. Therefore, even when the roof panel 4 is fully opened, a front portion of the roof panel 4 protrudes in the opening 3. On the other hand, the sunshade panel is disposed under the roof panel 4, and when the sunshade panel is moved horizontally and rearward to open, the entire sunshade panel is accommodated in the fixed roof 2.

Accordingly, a moving distance in a rear direction of the sunshade panel is larger than that of the roof panel 4, and therefore, the sunshade rails 20, 20 for guiding opening/closing of the sunshade panel extend further in a rear direction relative to the rear end portions of the guide rails 5, 5 for guiding opening/closing of the roof panel 4.

Accordingly, a rear portion of the sunshade rail extends in a cantilevered state and has low rigidity, and is susceptible to vibration when the vehicle is running, leading to a problem of noise generation.

In addition, the guide tubes P2, P4 for guiding extra length portions of the cables C1, C2, respectively, also extend in a cantilevered state and have low rigidity, and is susceptible to vibration when the vehicle is running, leading to a problem of noise generation.

Therefore, it would be desirable to provide a guide tube-fixing structure in a sunroof device in which rigidity of the rear portion of the sunshade rail protruding rearward relative to the guide rail of the roof panel, and rigidity of the guide tubes for the cables, are improved.

SUMMARY OF THE INVENTION

In one aspect of the present invention, there is provided a guide tube-fixing structure for a sunroof device, the sunroof device including: a roof panel for covering an opening of a fixed roof of a vehicle; a sunshade panel disposed under the roof panel; cables joined to the roof panel for opening and closing the roof panel by push-pull operation; guide rails for guiding opening/closing of the roof panel; and sunshade rails for guiding opening/closing of the sunshade panel, the guide rail and the sunshade rail both fixed to a vehicle body, the sunshade rail having a rear portion extending further rearward from a rear end portion of the guide rail, the guide tube-fixing structure including: a guide tube for the cable disposed along the extending rear portion of the sunshade rail; and fixed to the extending rear portion of the sunshade rail.

BRIEF DESCRIPTION OF THE DRAWINGS

The various aspects, other advantages and further features of the present invention will become more apparent by describing in detail illustrative, non-limiting embodiments thereof with reference to the accompanying drawings.

FIG. 2 illustrates open-close action of a roof panel in the sunroof device according to the first embodiment.

DETAILED DESCRIPTION OF THE EXEMPLARY EMBODIMENTS

Embodiments of the present invention will be described in detail below with reference to the drawings. In the following description, the present invention is exemplified with a vehicle (automobile), and terms "front (forward)", "ahead", "rear (rearward)", "behind", "upper" and "lower" mean respective sides relative to a vehicle body, and terms "left" and "right" mean respective sides relative to the vehicle body when seen from a driver/passenger seated in the vehicle body.

First Embodiment

A first embodiment of the present invention will be described in detail below, with referring to the drawings. Description will be made first with respect to an entire structure of the sunroof device, and then to a guide tube-fixing structure.

[Configuration of Sunroof Device]

Figure 1:
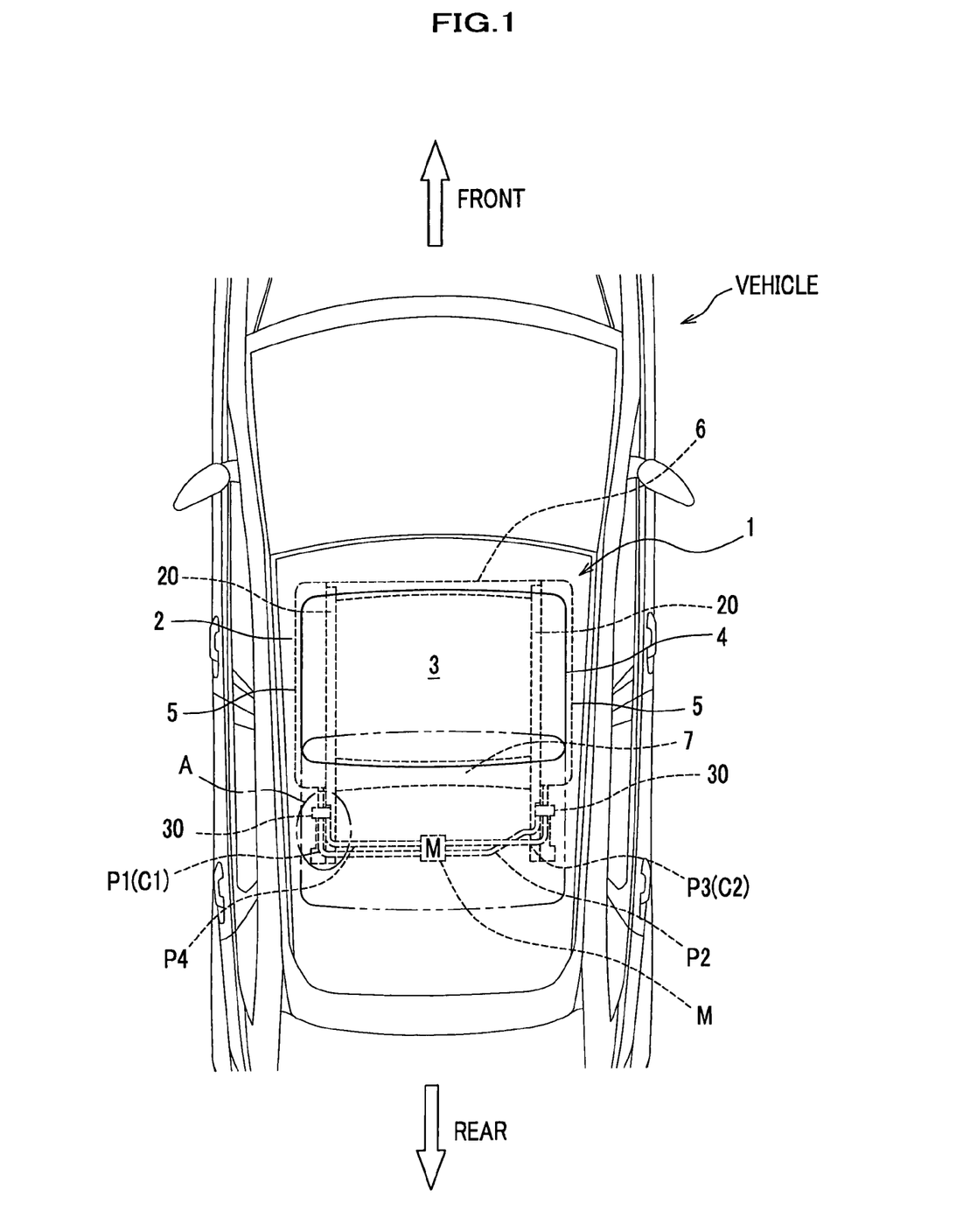
FIG. 1 is a plan view showing a sunroof device according to a first embodiment.

FIG. 1 is a plan view showing a sunroof device according to a first embodiment.

As shown in FIG. 1, a sunroof device 1 according to the present embodiment is an outer slide type (spoiler type) sunroof device which includes: a roof panel 4 for covering an opening 3 of a fixed roof 2 of a vehicle; a sunshade panel (not shown) disposed under the roof panel 4; cables C1, C2 joined to the roof panel 4 for opening and closing the roof panel 4 by push-pull operation; guide rails 5, 5 for guiding opening/closing of the roof panel 4; and sunshade rails 20, 20 for guiding opening/closing of the sunshade panel.

[Configuration of Roof Panel]

The roof panel 4 shown in FIG. 1 may be, for example, made of glass. When it is closed, it covers the opening 3 of the fixed roof 2, and when it is opened, it is flipped up by a tilt-and-slide mechanism which will be described below, and slides rearward on top of the fixed roof 2, to thereby partially overlap the fixed roof 2.

To the lateral rims of the roof panel 4, the respective cables C1, C2 are joined through the tilt-and-slide mechanism. By performing synchronous push-pull operation using the cables C1, C2, the roof panel 4 opens and closes while stably supporting the roof panel 4.

[Configuration of Guide Rail]

As shown in FIG. 1, the guide rails 5, 5 which are laterally symmetrical extend in a front-rear direction of the vehicle and are disposed under their respective lateral rims of the fixed roof 2 along the opening 3. The guide rail 5 is, for example, formed of extruded aluminum alloy member, and has a guide rail groove (not shown) for accommodating sliders of the tilt-and-slide mechanism, which will be described below, extending in the front-rear direction of the vehicle. Also along front and rear rims of the fixed roof 2 along the opening 3, there are disposed a front frame 6 joining front end portions of the guide rails 5, 5 and a rear frame 7 joining rear end portions of guide rails 5, 5.

[Configuration of Tilt-and-Slide Mechanism]

Figure 2A:
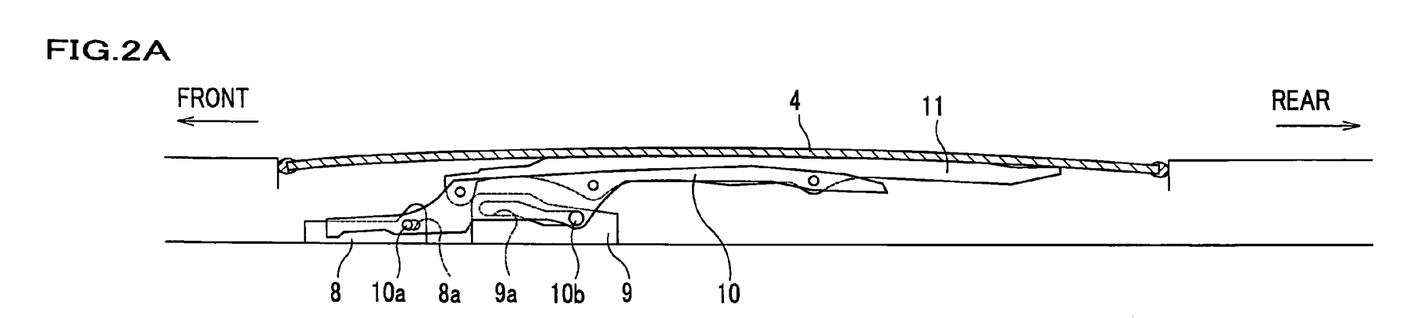
FIG. 2A is a side view of the roof panel in a fully-opened state.
Figure 2B:
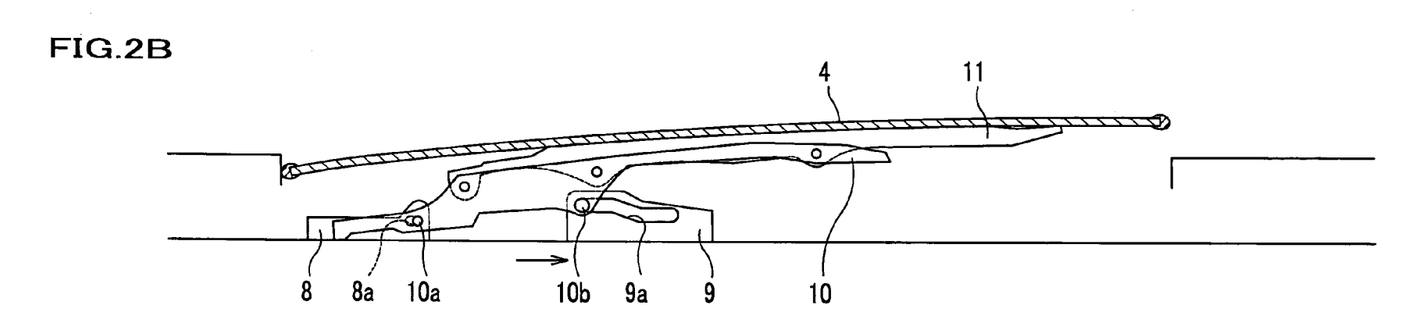
FIG. 2B is a side view of the roof panel in a tilt-up state.
Figure 2C:
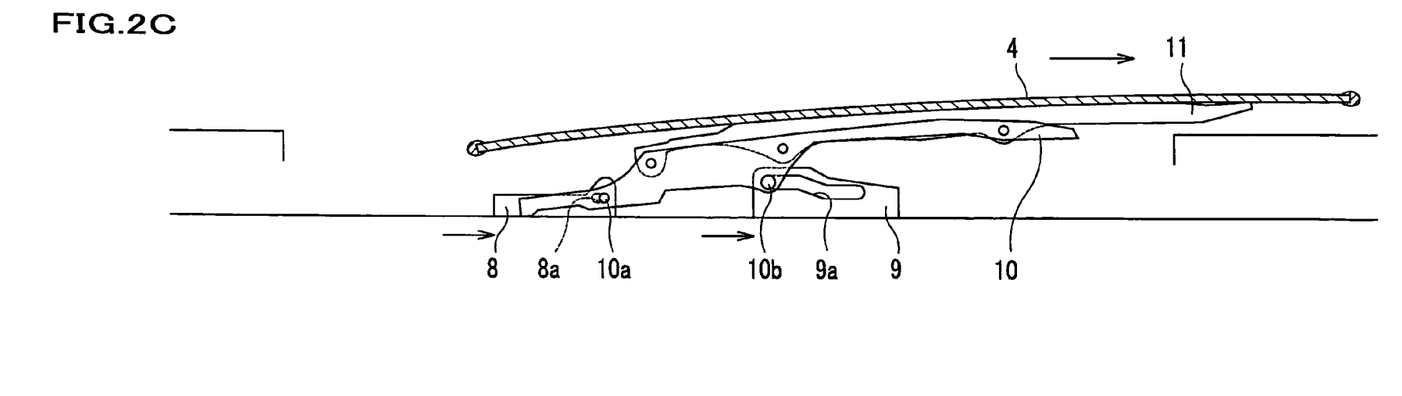
FIG. 2C is a side view of the roof panel sliding rearward.

FIG. 2 illustrates open-close action of a roof panel in the sunroof device according to the first embodiment, FIG. 2A is a side view of the roof panel in a fully-opened state, FIG. 2B is a side view of the roof panel in a tilt-up state, and FIG. 2C is a side view of the roof panel sliding rearward.

In each of the guide rails 5, 5, the tilt-and-slide mechanism serving both tilt mechanism parts and slide mechanism parts of the roof panel 4 is disposed. The tilt-and-slide mechanism has, as shown in FIG. 2A, the sliders (a front slider 8 and a rear slider 9) that slide in the front-rear direction of the vehicle in the guide rail groove formed in the guide rail 5; and a panel-supporting stay 10 with an upper portion being attached to the roof panel 4 and a lower portion being attached to the front slider 8 and the rear slider 9.

Since the tilt-and-slide mechanisms held in guide rails 5,5 have the same configuration, explanation is made only for one of the tilt-and-slide mechanisms in the present embodiment, and the duplicate explanation for the other tilt-and-slide mechanism is omitted.

In the front slider 8 and the rear slider 9, cam elongate holes 8a, 9a are formed, respectively, and in the panel-supporting stay 10, engaging pins 10a, 10b are formed for engaging the cam elongate holes 8a, 9a, respectively. The panel-supporting stay 10 is attached to a panel-supporting bracket 11, which in turn is joined to a lower face of the lateral rim of the roof panel 4.

To the rear slider 9, one end of the cable C1 or cable C2 (see FIG. 1) for performing push-pull operation is attached. The rear slider 9 is configured so as to slide along the guide rail 5 (see FIG. 1) in the front-rear direction of the vehicle, by push-pull operation of the cable C1 (C2). In conjunction with the slide movement of the rear slider 9, the panel-supporting stay 10 and the front slider 8 slide forward or rearward.

Next, open/close operation of the roof panel 4 by the tilt-and-slide mechanism will be described in detail. In FIG. 2A, the roof panel 4 is fully closed, and the front slider 8 and the rear slider 9 are at the foremost position. From this state, when the rear slider 9 rearward slides some distance by the cable C1, as shown in FIG. 2B, the engaging pins 10a, 10b of the panel-supporting stay 10 move along the cam elongate holes 8a, 9a of the front slider 8 and the rear slider 9, respectively, which lifts up a rear portion of the panel-supporting stay 10, and the roof panel 4 tilts up.

When the rear slider 9 further slides rearward from this position, as shown in FIG. 2C, the front slider 8 joined to the rear slider 9 through the panel-supporting stay 10 also slides rearward in conjunction with the slide movement of the rear slider 9, and the rear portion of the roof panel 4 overlaps the fixed roof 2 over the fixed roof 2, which leaves the roof panel 4 opened.

[Configuration of Cable]

To the lateral rims of the roof panel 4, the respective cables C1, C2 shown in FIG. 1 are joined through the tilt-and-slide mechanism (see FIG. 2). By performing synchronous push-pull operation using the cables C1, C2, the roof panel 4 opens and closes.

The cables C1, C2 are inserted in a drive motor unit M disposed behind the opening 3, and engage with a pinion gear (not shown) in the drive motor unit M, which allows push-pull driving of the cables C1, C2. It should be noted that the cables C1, C2 are inserted in the drive motor unit M in such a manner that the cables C1 and C2 are arranged in parallel and the cable C2 is positioned ahead of the cable C1.

A middle portion of each of the cables C1, C2 extends in a lateral direction of the vehicle at a rearward position relative to the opening 3, and is bent forward to follow along lateral sides of the vehicle, and therefore the both end portions of each of the cables C1, C2 extend in the front-rear direction of the vehicle. One end portion of each of the cables C1, C2 is joined to the rear slider 9 of the respective tilt-and-slide mechanism provided on lateral sides. The other end portion of each of the cables C1, C2, which is opposite to the above-mentioned joined end relative to the drive motor unit M, extends from the drive motor unit M as an extra length portion.

[Configuration of Guide Tube]

As shown in FIG. 1, in the cable C1, a portion of the cable C1 (driving path) on a joining side to one lateral rim of the roof panel 4, relative to the drive motor unit M, is inserted in a guide tube P1 for guiding the cable C1, and a rest of the cable C1 (idling path) on the other side is inserted in a guide tube P2 for guiding an extra length portion of the cable C1. Likewise, in the cable C2, a portion of the cable C2 (driving path) on a joining side to the other lateral rim of the roof panel 4 is inserted in a guide tube P3, and a rest of the cable C2 (idling path) on the other side is inserted in a guide tube P4 for guiding an extra length portion of the cable C2. The guide tubes P1, P2, P3, P4 may be, for example, formed of aluminum pipe or steel pipe.

It should be noted that, in the present embodiment, the cables C1, C2 are inserted in the drive motor unit M in such a manner that the cable C2 is positioned ahead of the cable C1, and the guide tube P2 for guiding the extra length portion of the cable C1 crosses the guide tube P3 for the cable C2 and the positions of the guide tube P2 and the guide tube P3 are switched in the middle.

[Configuration of Sunshade Panel]

The sunroof device 1 according to the present embodiment shown in FIG. 1 has a sunshade panel (not shown) for blocking light entering the opening 3, which opens/closes under the roof panel 4. When the sunshade panel is closed, it covers the opening 3 of the fixed roof 2, and when it is opened, it is moved horizontally and rearward, and is accommodated in the fixed roof 2. It should be noted that the sunshade panel in the present embodiment is configured to be manually operated from the interior side, but like the roof panel 4, the sunshade panel may be electrically opened/closed using. a drive motor unit.

[Configuration of Sunshade Rail]

The sunshade rail 20, 20 for guiding opening/closing of the sunshade panel are disposed inward in a vehicle-width direction relative to the guide rails 5, 5 as shown in FIG. 1, and symmetrical in a lateral (right-left) direction. In the sunshade rail 20, a sunshade rail groove for accommodating a slider (not shown) of the sunshade rail extends in the front-rear direction of the vehicle. The sunshade rails 20, 20 accommodate the sliders (not shown) provided on the lateral rims of the sunshade panel, and when both sliders slide along their respective sunshade rails 20, 20 in the front/rear direction, the sunshade panel opens/closes while stably supporting the sunshade panel. The sunshade rail 20 is, for example, formed of extruded aluminum alloy member.

Since the roof panel 4 is configured in such a manner that a rear side of the roof panel 4 tilts up and slides rearward in a tilt-up state, a rear portion of the roof panel 4 overlaps the fixed roof 2 when the sunroof device 1 is opened. Therefore, even when the roof panel 4 is fully opened, a front portion of the roof panel 4 protrudes in the opening 3. On the other hand, the sunshade panel is disposed under the roof panel 4, and when the sunshade panel is moved horizontally and rearward to open, the entire sunshade panel is accommodated in the fixed roof 2.

Accordingly, a moving distance in a rear direction of the sunshade panel is larger than that of the roof panel 4, and therefore, the sunshade rails 20, 20 for guiding opening/closing of the sunshade panel extend further in a rear direction relative to the rear end portions of the guide rails 5, 5 for guiding opening/closing of the roof panel 4.

[Guide Tube-fixing Structure]

Next, a fixing structure for the guide tubes P1, P2, P3, P4 will be described.

Figure 3:
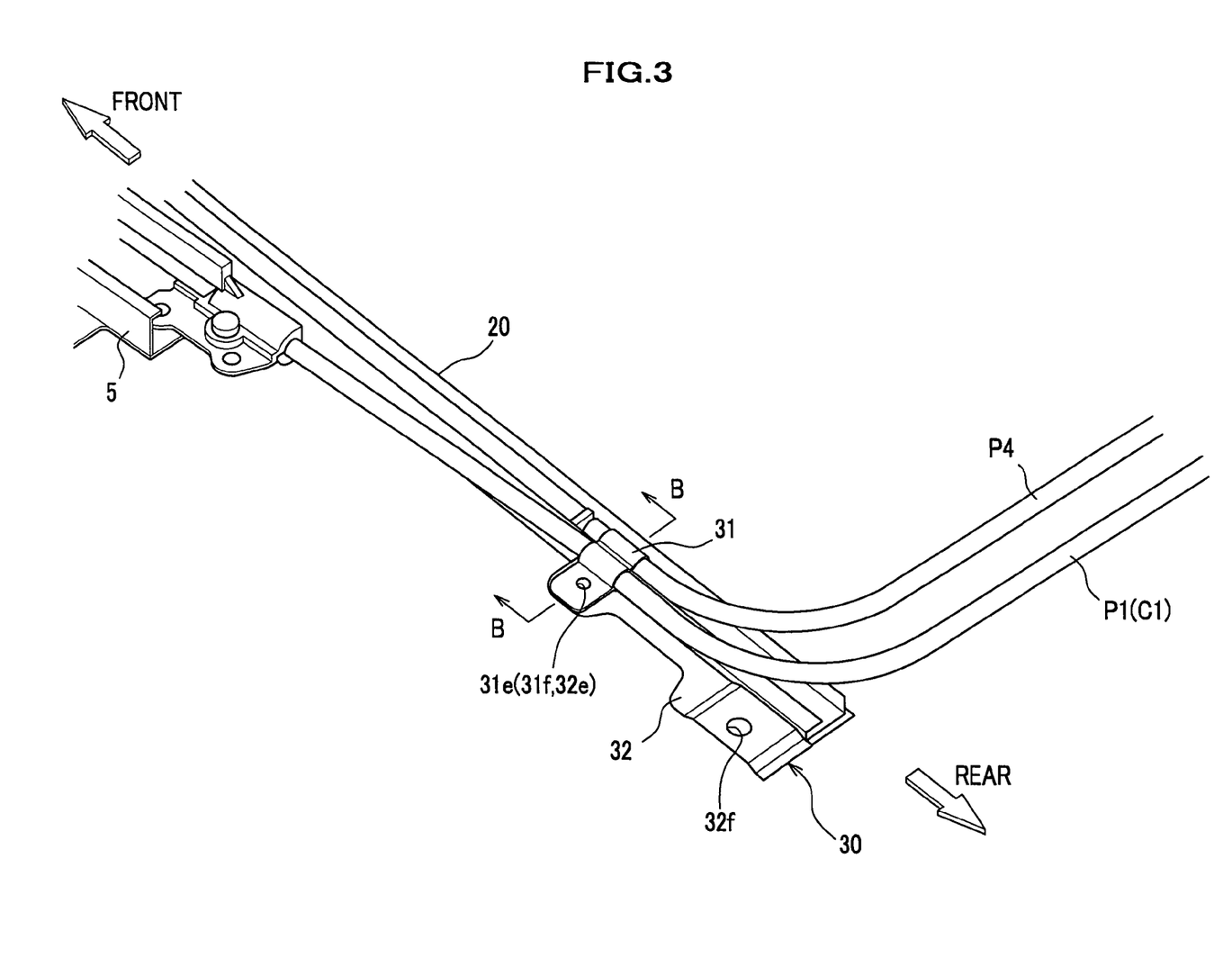
FIG. 3 is an enlarged perspective view of a portion A in FIG. 1 showing a portion of the sunroof device according to the first embodiment.
Figure 4:
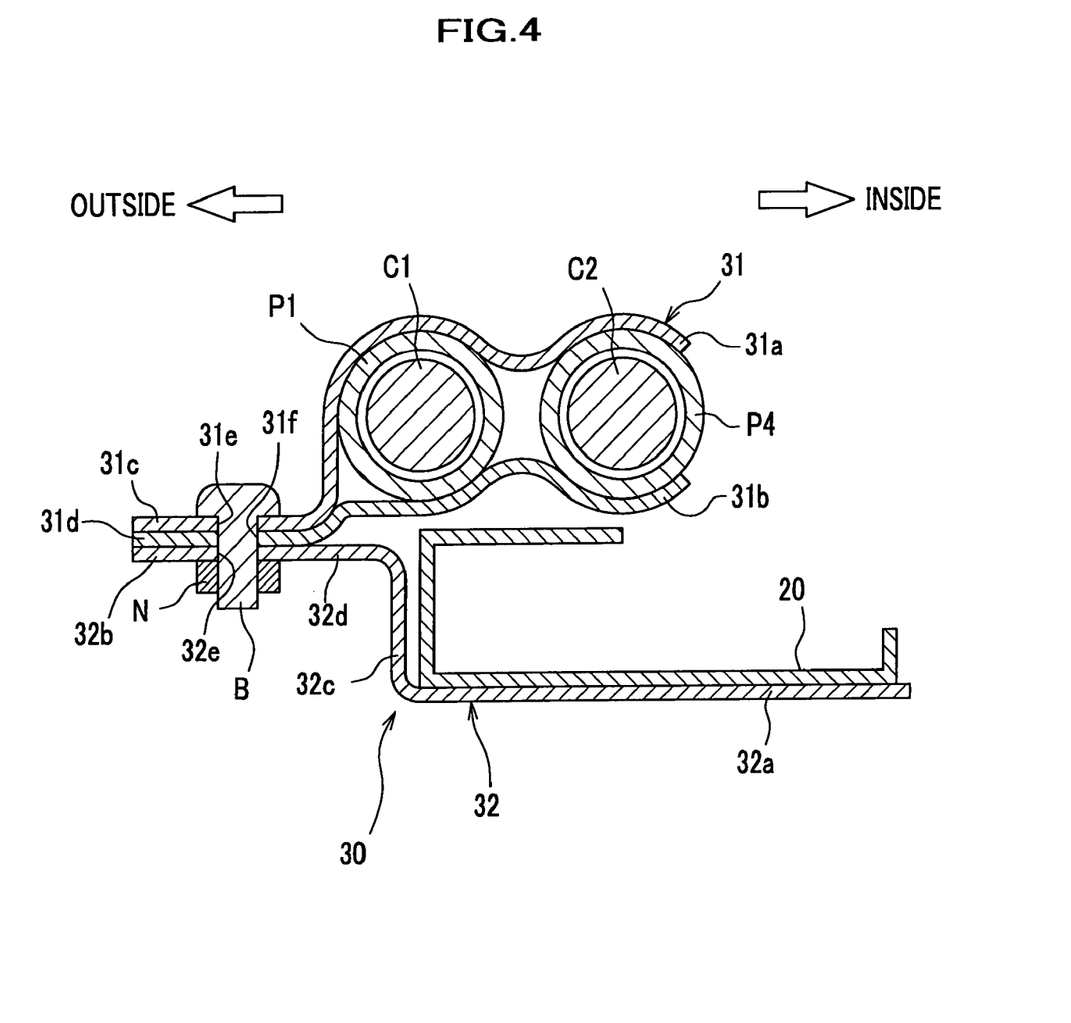
FIG. 4 is a cross section of a portion of the sunroof device according to the first embodiment taken along a line B-B of FIG. 3.

FIG. 3 is an enlarged perspective view of a portion A in FIG. 1 showing a portion of the sunroof device according to the first embodiment. FIG. 4 is a cross section of the sunroof device according to the first embodiment taken along a line B-B of FIG. 3.

In the present embodiment, as shown in FIG. 1, the fixing structure for the guide tubes P1, P4 disposed on the left side of the vehicle and the fixing structure for the guide tubes P2, P3 disposed on the right side of the vehicle are bilaterally symmetrical. Therefore, in the following descriptions, only the fixing structure for the guide tubes P1, P4 disposed on the left side will be explained, and the duplicate description for the fixing structure for the guide tubes P2, P3 disposed on the right side is omitted.

As shown in FIG. 3, a portion of the guide tube P1 is disposed along a rear portion of the sunshade rail 20 that extends rearward further from the rear end portion of the guide rail 5, and the end portion of the guide tube P1 is fixed to the rear end portion of the guide rail 5. The guide tube P4 is disposed along the rear portion of the sunshade rail 20 and positioned inside (right side in the drawing) relative to the guide tube P1 in terms of a lateral direction, and the end portion thereof is closed over the rear portion of the sunshade rail 20. The guide tubes P1, P4 are fixed to the rear portion of the sunshade rail 20 with a guide tube-fixing bracket 30.

The guide tube-fixing bracket 30 includes a tube-pinching member 31 for pinching the guide tubes P1, P4, and a rail-fixing member 32 for fixing the sunshade rail 20 to the vehicle body.

It should be noted that the guide tube-fixing bracket 30 corresponds to a means for fixing the guide tube.

The rail-fixing member 32 is a plate-shaped member extending in the front-rear direction of the vehicle, and as shown in FIG. 4, a sunshade rail portion 32a is formed for fixing to the rear portion of the sunshade rail 20. By screwing a nut (not shown) on a bolt (not shown) inserted in the through-hole (not shown) formed in rear portions of the sunshade rail portion 32a and the sunshade rail 20, the sunshade rail portion 32a of the rail-fixing member 32 is fixed to the rear portion of the sunshade rail 20.

In the rail-fixing member 32, along a rim of the sunshade rail portion 32a positioned outside in terms of a width direction of the vehicle (left side in FIG. 4), a mounting portion 32b is formed. The mounting portion 32b includes a vertical portion 32c vertically extending from an outer edge of the sunshade rail portion 32a, and a horizontal portion 32d horizontally and outward extending from an upper edge of the vertical portion 32c in a lateral direction. It should be noted that an upper face of the horizontal portion 32d is positioned slightly lower than an upper end face of the sunshade rail 20.

In addition, as shown in FIGS. 3 and 4, in a front portion of the horizontal portion 32d of the mounting portion 3b, a front-side mounting hole 32e for attaching the tube-pinching member 31 is formed, and in a rear portion of the horizontal portion 32d, a rear-side mounting hole 32f for attaching the guide tube-fixing bracket 30 is formed.

The tube-pinching member 31 includes an upper plate 31a and a lower plate 31b configured for pinching the guide tubes P1, P4 therebetween, as shown in FIG. 4. A portion of each of the upper plate 31a and the lower plate 31b is corrugated so as to steadily pinch the guide tubes P1, P4 therebetween, while keeping the guide tubes P1, P4 in parallel arrangement in a lateral direction. At outside (left side) portions of the upper plate 31a and the lower plate 31b in terms of a width direction of the vehicle, support portions 31c, 31d for attaching the upper plate 31a and the lower plate 31b to the upper face of the horizontal portion 32d of the mounting portion 32b of the rail-fixing member 32 are formed, respectively.

In the support portion 31c of the upper plate 31a and support portion 31d of the lower plate 31b, mounting holes 31e, 31f, respectively, are formed that together communicate with the front-side mounting hole 32e of the mounting portion 32b of the rail-fixing member 32. By screwing a nut N on a bolt B inserted in the mounting hole 31e of the upper plate 31a, the mounting hole 31f of the lower plate 31b and the front-side mounting hole 32e of the rail-fixing member 32, the tube-pinching member 31 in which the guide tubes P1, P4 are pinched is attached to the rail-fixing member 32.

In addition, by screwing a bolt (not shown) inserted in the rear-side mounting hole 32f of the mounting portion 32b of the rail-fixing member 32 shown in FIG. 3 into a threaded hole (not shown) of the vehicle body, the guide tube-fixing bracket 30 is fixed to the vehicle body.

As described above, the guide tube-fixing bracket 30 for fixing the guide tubes P1, P4 to the sunshade rail 20 also serves as a means for fixing the sunshade rail 20 to the vehicle body.

[Effect of Guide Tube-Fixing Structure]

According to the above-mentioned guide tube-fixing structure, the guide tubes P1, P2, P3, P4 for the cables C1, C2 are fixed to the rear portions of their respective sunshade rails 20, 20, as shown in FIG. 1, which improves rigidity of the rear portions of the sunshade rails 20, 20 and rigidity of the guide tubes P1, P2, P3, P4. Consequently, the sunshade rails 20, 20 and the guide tubes P1, P2, P3, P4 are prevented from vibrating when the vehicle is running, leading to reduction of noise that may otherwise be caused by the vibration. At the same time, endurance to vibration is also improved, leading to improved quality of the sunroof device 1.

By introducing the guide tube-fixing bracket 30 integrally molded, it becomes possible to fix the guide tubes P1, P4 (P2, P3) to the sunshade rail 20, and at the same time, to fix the sunshade rail 20 to the vehicle body. Therefore, the guide tube-fixing structure can be made compact.

Second Embodiment

Next, a second embodiment of the present invention will be described with reference to FIGS. 5-7.

Figure 5:
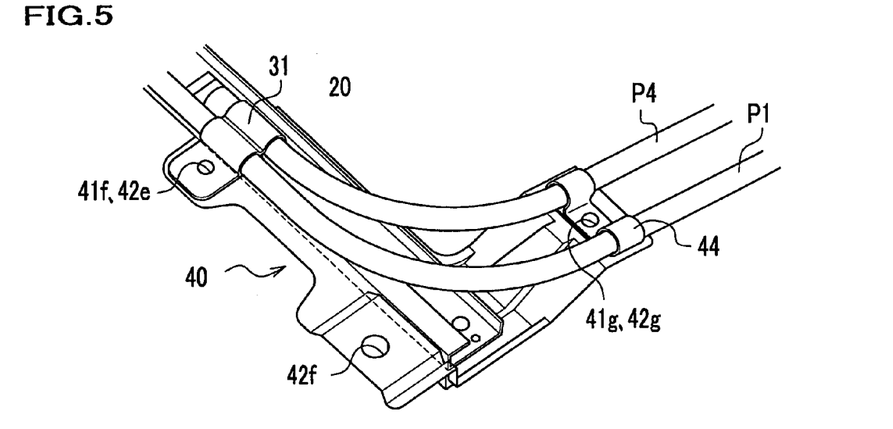
FIG. 5 is an enlarged perspective view, like FIG. 3, of a portion A in FIG. 1 showing a portion of a sunroof device according to a second embodiment.
Figure 6:
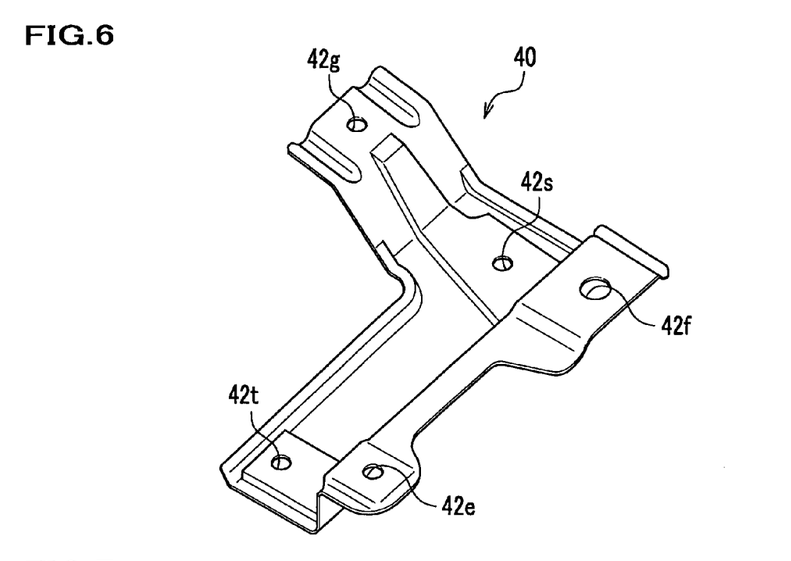
FIG. 6 is a perspective view of an entire guide tube-fixing bracket of the sunroof device according to the second embodiment.

FIG. 5 is an enlarged perspective view, like FIG. 3, of a portion A in FIG. 1 showing a portion of a sunroof device according to a second embodiment. FIG. 6 is a perspective view of an entire guide tube-fixing bracket of the sunroof device according to the second embodiment. FIG. 7 is a schematic diagram showing a structure model for illustrating open-box structure of the sunroof device according to the second embodiment.

In the present specification, the term "open-box structure" means such a structure as a hexahedron box without some faces or structure members (e.g. frames) that still maintains a box structure by structural cross members (e.g. beams and bars) connecting: faces; joints of the structure members; or a face and a joint of the structure members.

Also in the present embodiment, as shown in FIG. 1, the fixing structure for the guide tubes P1, P4 disposed on the left side of the vehicle and the fixing structure for the guide tubes P2, P3 disposed on the right side of the vehicle are bilaterally symmetrical. Therefore, in the following descriptions, only the fixing structure for the guide tubes P1, P4 disposed on the left side will be explained, and the duplicate description for the fixing structure for the guide tubes P2, P3 disposed on the right side is omitted.

In the present embodiment, as a means for fixing the guide tubes P1, P4, a guide tube-fixing bracket 40 is provided.

Figure 7:
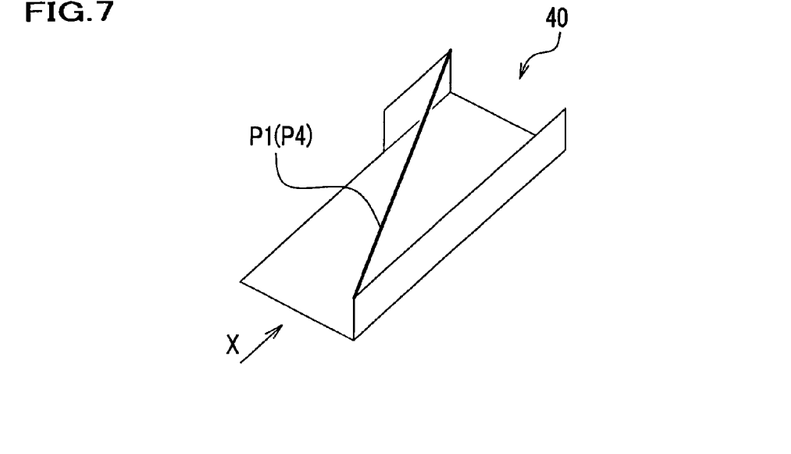
FIG. 7 is a schematic diagram showing a structure model for illustrating an open-box structure of the sunroof device according to the second embodiment.

The guide tube-fixing bracket 40 and the guide tubes P1, P4 together form an open-box structure as shown in FIG. 7.

As shown in FIG. 7, a simplified model of the guide tube-fixing bracket 40 has an oblong square-shaped bottom plate and two side plates standing only on one pair of opposing sides. This structure has an approximate squared U-shaped cross section when seen from a side of an arrow X (seen from a front side of the vehicle in FIG. 1).

By fixing the guide tubes P1, P4 as structural members, end portions of the standing and opposing side plates, which are diagonal relative to the bottom plate, are joined.

In this manner, by attaching the guide tube-fixing bracket 40 to the guide tubes P1, P4, an open-box structure is formed.

Next, a configuration of the present embodiment will be specifically described. In the descriptions above, the guide tube-fixing bracket 40 is represented by the simplified model of FIG. 7. However in the present embodiment, the guide tube-fixing bracket 40 has a shape that suffices fixation of the sunshade rail 20 and attachment to the guide tubes P1, P4, as shown in FIG. 6, which is within the range that maintains the features of the structure model described above.

The guide tube-fixing bracket 40 has: holes 42e, 42g for mounting the tube-pinching members 31, 44, respectively; holes 42s, 42t for fixing the guide tube-fixing bracket 40 to the sunshade rail 20; and a rear-side mounting hole 42f for mounting the guide tube-fixing bracket 40 to the vehicle body.

The guide tube-fixing bracket 40 is fastened to the sunshade rail 20 by bolts inserted in the holes 42s, 42t with nuts and the like. The tube-pinching members 31, 44 in which the guide tubes P1, P4 are pinched (see FIG. 4) are fastened by bolts inserted in the holes 42e, 42g of the guide tube-fixing bracket 40 fixed to the sunshade rail 20 as well as the holes 41f, 41g of the tube-pinching members 31, 44, with nuts and the like.

FIG. 5 shows a state in which all of the above-mentioned members are mounted, which forms an open-box structure in the present embodiment.

According to this configuration, the open-box structure improves rigidity of the rear portion of the sunshade rail 20 and rigidities of the guide tubes P1, P4, which prevents vibration of the sunshade rail 20 and the guide tubes P1, P4, leading to further reduction of noise that may otherwise be caused by vibration of the sunshade rail 20 and the guide tubes P1, P4.

Moreover, a contact between the guide tubes P1, P4 due to vibration or the like can be prevented, positioning accuracy of the members are improved, and breakage during assembly due to contact of the members can be avoided.

It should be noted that the guide tube-fixing bracket 40 may be formed of a single member integrally formed, or may be formed of a plurality of members.

When the guide tube-fixing bracket 40 is formed of a single member integrally formed, a number of parts can be reduced, leading to improvement in mass-production. In addition, selection of materials becomes wider, which allows more suitable selection of materials depending on vibration environment.

When the guide tube-fixing bracket 40 is formed of a plurality of members, a plurality of joint portions are provided, which provides a plurality of high natural frequencies, leading to suppression of resonance phenomenon.

Other Embodiments

The embodiment of the present invention has been described above. However, the present invention is not limited to the above embodiments, and it is a matter of course that the above embodiment may be properly modified. For example, in the embodiment described above, the guide tubes P1, P4 are fixed by pinching them by the tube-pinching member 31 of the guide tube-fixing bracket 30, as shown in FIG. 4. However, any fixing method can be used, and the guide tubes P1, P4 may be fixed by fitting them to grooves formed in the guide tube-fixing bracket 30, or the guide tubes P1, P4 may be fixed by inserting them in the through-holes formed in the guide tube-fixing bracket 30.

In addition, in the embodiments described above, the outer slide type (spoiler type) sunroof device 1 as shown in FIGS. 1 and 2 is exemplified. However, the present invention is applicable to an inner slide type sunroof device in which the roof panel 4 opens while maintaining a tilt-down state.

What is claimed is:

1. A guide tube-fixing structure for a sunroof device, the sunroof device comprising: a roof panel for covering an opening of a fixed roof of a vehicle; a sunshade panel disposed under the roof panel; cables joined to the roof panel for opening and closing the roof panel by push-pull operation; guide rails for guiding opening/closing of the roof panel; and sunshade rails for guiding opening/closing of the sunshade panel, the guide rail and the sunshade rail both fixed to a vehicle body, the sunshade rail having a rear portion extending further rearward from a rear end portion of the guide rail, the guide tube-fixing structure comprising: a guide tube for the cable disposed along the extending rear portion of the sunshade rail, and fixed to the extending rear portion of the sunshade rail.

2. The guide tube-fixing structure according to claim 1, further comprising a means for fixing the guide tube to the sunshade rail that serves also as a means for fixing the sunshade rail to the vehicle body.

3. The guide tube-fixing structure according to claim 1, further comprising a means for fixing the guide tube to the sunshade rail formed of a guide tube-fixing bracket, the guide tube-fixing bracket being attached to the guide tube and together forming an open-box structure.

4. The guide tube-fixing structure according to claim 3, wherein the guide tube-fixing bracket is formed of a single member integrally molded.

5. The guide tube-fixing structure according to claim 3, wherein the guide tube-fixing bracket is formed of a plurality of members.

6. The guide tube-fixing structure according claim 1, further comprising a guide tube for guiding an extra length portion of the cable fixed to the rear portion of the sunshade rail.

* * * * *